United States Patent [19]

Downing et al.

[11] Patent Number: 5,620,132
[45] Date of Patent: Apr. 15, 1997

[54] APPARATUS AND METHOD FOR REMOVING MELTABLE MATERIAL FROM A SUBSTRATE

[75] Inventors: Andrew J. Downing, Milwaukee, Wis.; Donald C. Foster, Westminster, Colo.; Karl J. Puttlitz, Wappingers Falls, N.Y.

[73] Assignee: International Business Machines Corporation, Armonk, N.Y.

[21] Appl. No.: 461,960

[22] Filed: Jun. 5, 1995

Related U.S. Application Data

[62] Division of Ser. No. 269,854, Jun. 30, 1994, Pat. No. 5,458,281.

[51] Int. Cl.$^6$ .................................................. H01L 21/44
[52] U.S. Cl. ............................................ 228/264; 228/19
[58] Field of Search ........................................ 228/264, 19

[56] References Cited

U.S. PATENT DOCUMENTS

| | | | |
|---|---|---|---|
| 2,219,423 | 10/1940 | Kurtz | 419/61 |
| 3,865,298 | 2/1975 | Allen et al. | 228/20 |
| 4,164,606 | 8/1979 | Spirig | 428/605 |
| 4,323,631 | 4/1982 | Spirig | 428/605 |
| 4,327,472 | 5/1982 | Kyzeptowski | 228/264 |
| 4,416,408 | 11/1983 | Spirig | 228/19 |
| 5,072,874 | 12/1991 | Bertram et al. | 228/264 |
| 5,219,520 | 6/1993 | Brofman et al. | 419/35 |
| 5,284,286 | 2/1994 | Brofman et al. | 228/19 |

FOREIGN PATENT DOCUMENTS

| | | |
|---|---|---|
| 162811 | 5/1955 | Australia. |
| 661780 | 11/1951 | United Kingdom. |

OTHER PUBLICATIONS

Acocella, et al., Proceedings of the 1993 International Conference and Exhibition on Multichip Modules, Radisson Hotel Denver, Apr. 14–16, 1993, "Mixed Wirebond, TAB and Flipchip Interconnections on Multi–Layer Ceramic MCM's".

Puttlitz, et al., 44th Electronic Components & technology Conference, 1994, "C–4/BGA Comparison with other MLC Single Chip Package Alternatives".

Puttlitz, Journal of Microcircuits & Electronic packaging, vol. 15, No. 3, Third Quarter 1992, "An Overview of Flip–chip Replacement Technology on MLC Multichip Modules".

Reiley, IBM Technical Disclosure Bulletin, vol. 27, No. 10b, Mar. 1985, "Chip Rework on Multilayer Ceramic Recess".

Beaman, et al., IBM Technical Disclosure Bulletin, vol. 29, No. 8, Jan. 1987, "Heated Air Knife for Removing Solder From Contacts".

Brown, et al., Proceedings of the Technical Conference; 1992 International Electronics Packaging Conference, Austin, Texas, Sep. 27–30, 1992, "A New Land Grid Array Package Family: An Industry Standard High Pin–out Packaging Concept".

Schink, et al., IBM Technical Disclosure Bulletin, vol. 18, No. 5, Oct. 1975, "Cleaning of Solder Pads Prior to a Rework Operation".

Le Pape, IBM Technical Technical Disclosure Bulletin, vol. 24, No. 7a, Dec. 1981, "Use of a Tinned Copper Slug for Module Reworking".

Moore, et al., IBM Technical Disclosure Bulletin, vol. 25, No. 5, Oct. 1982, "Method for Manufacturing Porous Metal Devices".

(List continued on next page.)

*Primary Examiner*—Kenneth J. Ramsey
*Attorney, Agent, or Firm*—Aziz M. Ahsan

[57] ABSTRACT

The present invention relates generally to a new apparatus and method for removing solid material and liquid material that may contain solid material from a substrate. More particularly, the invention encompasses an apparatus and method for removing molten solder which may contain solid particles and solder balls or columns from a substrate using a unique squeegee. Also, disclosed is a method for removing solder balls or columns from a substrate using a backer having an adhesive thereon.

24 Claims, 1 Drawing Sheet

OTHER PUBLICATIONS

Ward, et al., IBM Technical Disclosure Bulletin, vol. 19, No. 7, Dec. 1976, "Low–Temperature Soldered Component Removal".

Miller, IBM Technical Dosclosure Bulletin, vol. 12, No. 4, Sep. 1969, "Tinning Closely Spaced Leads".

Poliak, et al., IBM Technical Disclosure Bulletin, vol. 13, No. 2, Jul. 1970, "Solder Wick".

APPARATUS AND METHOD FOR REMOVING MELTABLE MATERIAL FROM A SUBSTRATE

CROSS-REFERENCE TO A RELATED PATENT APPLICATION

This patent application is a divisional patent application of U.S. patent application Ser. No. 08/269,854, filed on Jun. 30, 1994, now U.S. Pat. No. 5,458,281, which issued on Oct. 17, 1995.

FIELD OF THE INVENTION

The present invention relates generally to a new apparatus and method for removing meltable material from a substrate. More particularly, the invention encompasses an apparatus and method for removing molten solder which may contain solid particles and solder balls or columns from a substrate using a unique squeegee. Also, disclosed is a method for removing solder balls or columns from a substrate using a device having an adhesive on at least one surface. The molten solder residual left on the substrate can then be removed.

BACKGROUND OF THE INVENTION

A current scheme for making changes to electronic substrates, such as ceramic, glass or glass-ceramic substrates, uses redundant connection pads to add new connections or delete existing connections. The original connections from the integrated circuit chips, hereinafter referred to as IC's, to the electronic substrate are normally made using solder or braze connections between the IC's and the connection pads located beneath the IC's. Surplus connection pads, each of which is connected to an original connection pad, are located around the periphery of the IC's. New or additional connections may be made between redundant connection pads, for example, by wire bonding, staple bonding or by the use of decals. Connections may be deleted by severing the line connecting a redundant pad to an original pad. If, during electronic substrate rework, an IC must be removed and replaced, solder and braze removal is limited to the area that was directly below the IC, leaving the peripheral connections undisturbed.

However, because space on a substrate is both scarce and valuable, it is desirable to use the available space between the original connection pads beneath the chip itself, rather than, or in addition to, the peripheral area, to make such circuit changes. In such a scheme it becomes necessary to remove solder or braze from the original connection pads without disturbing the immediately adjacent areas where fragile connections, such as wire bonds, staple bonds or decals, may be present. Additionally, if the redundant connection pads are deposited with a layer of gold, it may be desirable to prevent solder or braze from depositing over the gold or dissolving the gold soldering rework.

The ability to remove solder or braze from a surface is similarly desirable for making changes to any electronic circuit substrate which uses surface-mounted IC's, components or wiring, for example, epoxy-based electronic cards.

A variety of devices for removal of solder or braze from electronic substrates have been previously disclosed. The disclosed devices can be classified by two approximate categories, the first being flat-surface blocks for the solder or braze removal, and the second being wicks for the removal of solder or braze from the surface of an electronic substrate.

Within the flat-surface block category, for example, is disclosed a tinned porous copper slug prepared by powder metallurgical methods for module reworking, "Use of a Tinned Copper Slug for Module Reworking", IBM Technical Disclosure Bulletin, Vol. 24, No. 7A, p. 3481 (December 1981). A tinned copper slug is applied to a substrate and the tinned copper slug absorbs melted solder by capillary action as the substrate is heated.

Also disclosed in the flat-surface block category is a porous copper block having solid plated studs:, "Chip Rework on Multilayer Ceramic Recess", IBM Technical Disclosure Bulletin, Vol. 27, No. 10B, p. 6344 (March 1985). A porous copper block having solid plated studs is placed on a substrate, such that the solid plated studs enter substrate recesses where excess solder is located. As the copper block is pushed down, the solid plated studs are forced into the recesses, the excess solder is then pushed outwardly and it is then absorbed by the base portion of the porous copper block.

Several variations of wicks capable of absorbing solder by capillary action have been disclosed. For example, U.S. Pat. No. 4,164,606 discloses a wick formed by braiding strands of copper that have been individually coated with solder. U.S. Pat. No. 4,323,631 discloses a wick formed from strands of non-metallic material which are coated with metal and flux to render the fibers more capable of wetting. U.S. Pat. No. 4,416,408 discloses a wick comprised of an open mesh of strands.

Several methods for making porous metal devices have been previously described. Disclosed in IBM Technical Disclosure Bulletin, Vol. 25, No. 5, p. 2285 (October 1982), is a method for making porous metal devices which employs a single sintering step. A mold is filled with copper powder, vibrated, covered and heated to a temperature of 890 degrees Celsius in an atmosphere of disassociated ammonia. After cooling, the copper devices, which have undergone approximately 10 percent shrinkage, are removed from the mold. U.K. Patent No. 661,780 discloses a strikingly similar process for making porous metal molds to be used to make pottery and wood fiber egg trays.

Australian Patent No. 162,811 also discloses a method for making porous metal devices. Spherical particles are used which have a metal coating that is softer than the core metal and preferably alloyable with the core metal. The particles are compressed into a briquette, such that the softer coating is distorted and holds adjacent particles together. The briquette is then sintered such that the softer coating alloys with the harder core.

U.S. Pat. No. 2,219,423 discloses a method for forming porous metal articles of a complex shape. Flat briquettes are placed over a mold having a complex shape. The mold cover which may have a shape that matches the mold is placed over the briquette before sintering. During sintering the weight of the mold cover presses the briquette until it conforms to the shape of the mold.

Brofman, et al., U.S. Pat. Nos. 5,219,520 and 5,284,286, issued to the assignee of the instant patent application, disclose a porous metal block that is used to selectively remove solder or braze from a semiconductor substrate. The porous metal block comprises a plurality of protrusions which absorb the solder or braze through capillary action. Disclosed according to the invention is a porous metal block for selectively removing solder or braze from a substrate. The porous metal block comprises at least one protrusion capable of absorbing solder or braze through capillarity. Also disclosed is a sintering process for making the block employing two sintering steps. A mold is filled with metal powder and presintered (partially sintered) to form a presintered porous metal block strong enough for subsequent processing. The presintered porous metal block is then ejected from the mold and fully sintered at a higher temperature.

Miller, IBM Technical Disclosure Bulletin, Vol. 12, No. 4, Page 548 (September 1969), discloses a method for removal of excess solder by using a jet of hot oil. The solder is melted and is carried away by the hot oil.

Schink, et al., IBM Technical Disclosure Bulletin, Vol. 18, No. 5, Pages 1384–85 (October 1975), disclose the cleaning of solder pads prior to a rework operation. The solder to be removed is heated by a hot gas which is directed towards the solder pad site and the exiting hot gas heats and dislodges the solder and the solder debris become a part of the jet stream and is thus removed.

Ward, IBM Technical Disclosure Bulletin, Vol. 19, No. 7, Page 2476 (December 1976), discloses a method of removing solder on a substrate by immersing the substrate in a solder alloy which will dissolve C4 tin lead connections.

The possible rework methods can be grouped into 3 categories: Solder wicking methods that absorb liquid solder into a porous medium or similar material, a dissolution method in which a module is immersed into a liquid solder bath that removes the high lead components, and a fluid impingement method such as a modified solder leveling technique.

The wicking method involves two steps, removing the solder ball or columns and then dressing the off-eutectic residue using an absorbing material. But because the eutectic temperature associated with the molten portion of the residue is below the liquidus temperature of the disbursed solid residue, wicking devices such as porous copper blocks act as separating devices, absorbing the liquid portion but leaving behind the solid proeutectic Pb-rich phase components. Another disadvantage to this two-step process is that two thermal excursions are required, one to remove the solder balls or columns and the second to dress the residue.

Dissolution methods only require one thermal excursion. They utilize a solder bath, usually of eutectic composition, in which the solid Pb-rich phase components of the off-eutectic solder joints dissolves into the solution. As the bath is used over time, the composition of the bath changes, increasing in lead content and so too correspondingly the liquidus temperature. These Pb additions beyond the eutectic composition result in a Pb-rich phase precipitating out of the liquid. Thus, the solder bath must be changed from time to time.

Fluid impingement methods such as a hot gas solder leveling technique would work well to remove the solder balls or columns and dress the residue on the pads. But, the high-lead components will stay solid and blow around on the ceramic substrate. This can result in solder being imbedded into the ceramic posing a metal migration concern. Even if a fluid or flux is used to coat the ceramic substrate first, particle imbedding can occur due to the high velocities of the air stream impinging on the substrate.

PURPOSES AND SUMMARY OF THE INVENTION

The invention is a novel method and an apparatus for removing molten and solid material from a substrate, such as, for example, solder.

Therefore, one purpose of this invention is to provide an apparatus and a method that will remove solder from a substrate.

Another purpose of this invention is to provide an apparatus and a method that will remove solid solder balls or solder columns from a substrate.

Yet another purpose of this invention is to provide an apparatus and a method that will remove liquid solder from a substrate.

Yet another purpose of this invention is to provide an apparatus and a method that will remove liquid solder containing varying amounts of solid material from a substrate; using a squeegee.

Yet another purpose of this invention is to provide an apparatus and a method that will remove solder balls or solder columns from a substrate, using a squeegee.

Yet another purpose of this invention is to provide an apparatus and a method that will remove liquid solder from a substrate, using a squeegee.

Yet another purpose of this invention is to provide an apparatus and a method that will remove liquid solder containing varying amounts of solid material from a substrate.

Therefore, in one aspect this invention comprises a method for removing at least one molten or solid structure from a surface comprising the steps of:

(a) placing said surface with said at least one low melting point structure in a fluid bath, (b) raising the temperature of said fluid bath to the melting point level of said low-melting point structure, and (c) squeegeeing off said at least one molten or solid structure from said surface by using at least one blade.

In another aspect this invention comprises a method of removing solder from a substrate comprising the steps of:

(a) contacting at least a portion of said solder with at least one adhesive material, (b) raising the temperature of at least a portion of said solder to its melting point level, such that at least a portion of said solder separates from the surface of said substrate and sticks to at least a portion of said adhesive material, and thereby said solder is removed from said at least substrate.

In yet another aspect this invention comprises an apparatus for removing at least one molten or solid structure from the surface of a substrate comprising:

(a) a container having at least one fluid bath, (b) at least one means to immerse at least a portion of said substrate into at least a portion of said fluid bath, (c) said container having at least one means to secure and relatively move at least one blade, (d) at least one means in said container to raise the temperature of said fluid bath to the melting point level of said meltable structure, and (e) wherein at least a portion of said at least one blade is slid against a portion of the surface of said substrate to remove said at least one meltable structure from said surface.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DETAILED DESCRIPTION OF THE INVENTION

This invention addresses another method and apparatus for removing solder from a substrate. The process basically involves the solder removal during the rework process. A prime application for this process is for the removal of the so-called dual-alloy, ball or column grid array solder joint structure. This involves melting the off-eutectic solder which serves to attach the higher melting point balls or columns to the substrate or module. A mechanical-type wiper blade, made from a high temperature resistant polymer, removes the solid balls or columns and the liquid off-eutectic solder containing Pb-rich solid particles in one step. The advantages of this method is that the high melting-point proeutectic Pb-rich particles dispursed within the liquid are removed and at the same time as the liquid and solid balls or columns. Thus, the substrate or module pad are directly restored to a metallurgical condition which allows replacing the BGA (Ball Grid Array) or CGA (Column Grid Array) joints in a manner similar to original attachment. This is achieved by exposing the substrate or module to just one thermal exposure, reducing the opportunity for degradation and reduces cost by reducing process steps. For this process to work without imbedding solder into the ceramic substrate, a lubricating material must be used which allows the pads to be dressed and provides a thin lubricating film preventing solder from imbedding into the ceramic between the pads. The lubricating material or the fluid bath material used was a synthetic polyolefin oil utilized in a bath in which the module was immersed. When the module attains the correct temperature, it is passed over the wiper blade at a prescribed speed and pressure. The speed is typically 0.75 inches per second and the pressure is usually between about 200 g to about 600 g. After the solder is removed, the modules are cleaned and new solder structures, such as, for example, BGA or CGA, are attached using the normal process.

Figure 1:
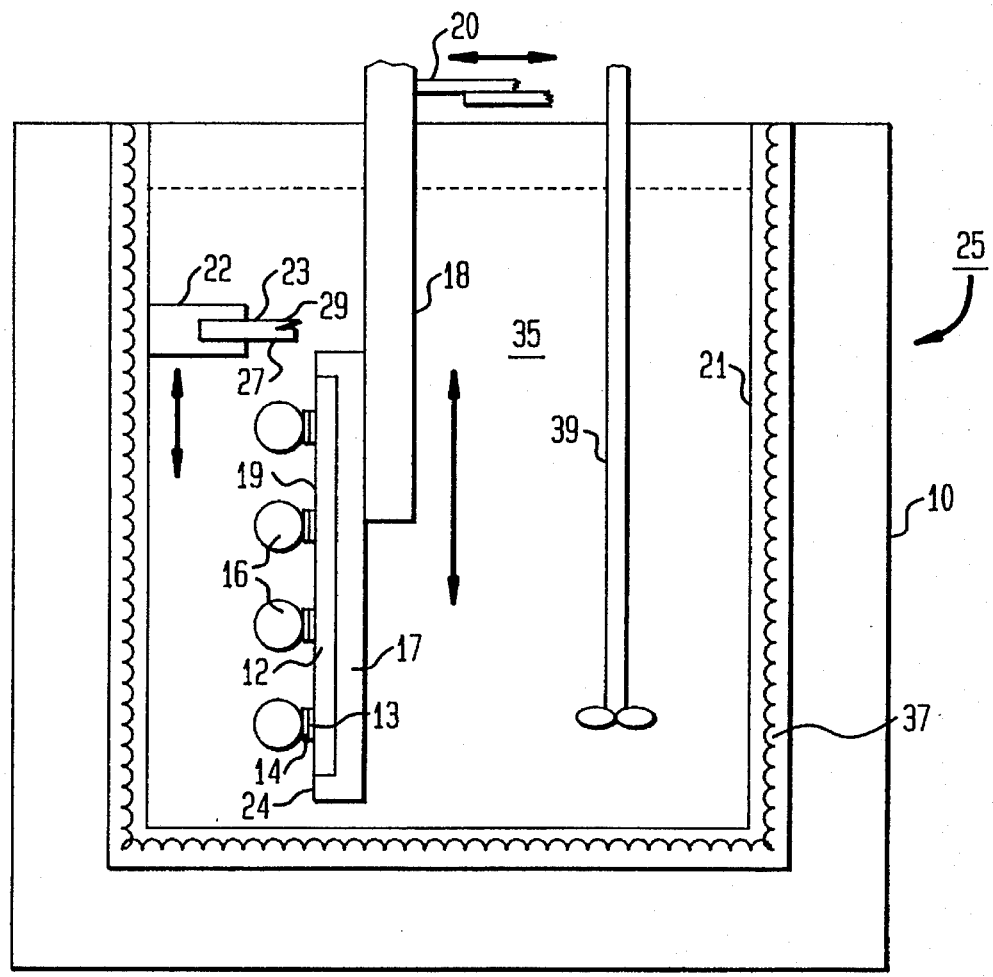
FIG. 1, illustrates a preferred embodiment of this invention.
Figure 2:
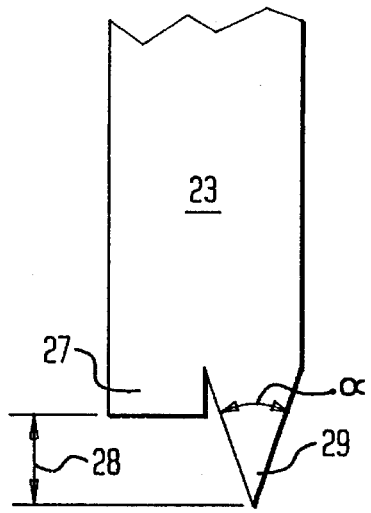
FIG. 2, illustrates a preferred embodiment of the squeegee blade used in this invention.

The preferred embodiment of the invention is illustrated in FIG. 1, while the preferred embodiment of the inventive squeegee blade of this invention is shown in more detail in FIG. 2. The solder removal apparatus 25, comprises of a container 10, having an inner wall 21, and fluid 35. Means 37, such as a heater 37, are provided in the apparatus 25, for heating the fluid 35. Similarly, means 39, such as a stirrer 39, can also be provided to stir the fluid 35. A squeegee or wiper blade 23, having a bumper 27, and a wiping or trailing end 29, is secured to the inner wall 21, of the container 10, via at least one fixture 22. A module or substrate 12, having at least one electrical connection 16, such as, for example, solder ball or column 16, with at least one lower-melting solder layer or pad 14, is held in a fixture 17 which is secured to a "Z" slide 18, which can move at least a portion of the substrate 12, in and out of the fluid 35, and/or the container 10. The "Z" slide 18, is in turn secured to an "X" slide 20, that moves the substrate 12, back and forth within the fluid 35, and the container 10. For some applications one could also have a "Y" slide (not shown) to move the fixture 17, and the substrate 12, in the "Y" direction. The electrical connection 16, are typically connected to the substrate or module 12, via a lower-melting point solder layer or pad 14, and a metallic type pad 13. Upon heating the substrate 12, in a fluid bath 35, the lower-melting point solder layer 14, becomes a molten dispersion or a "liquid" with variable amounts of solid particles, while the pad 13, and the solder balls or columns 16, typically remain a solid. This is due to the fact that both pad 13, and solder balls 16, are made from materials that have a higher melting point.

For the purposes of illustration only the removal of the solder material 16 and 14, such as, a high-melting point solder ball or column 16, (eg. 90 Pb–10 Sn) and the low-melting point solder pad 14, (e.g., eutectic Pb-Sn), will be discussed here. The combination of the low and higher-melting materials together comprise the so-called dual-alloy solder structure.

The module or substrate 12, having the solder balls or solder columns 16, on a solder pad 14, are secured to the "Z" slide 18, such that the balls or columns 16, face the squeegee blade 23. When properly positioned, the module or substrate 12, could be held in place with a clamping mechanism. At this point the module or substrate 12, is ready for introduction into the inventive solder removal tool 25. The removal tool 25, has a container 10, which is typically made from, for example, stainless steel. One or more heaters 37, is provided to heat the fluid 35. Provision is made for raising and lowering the module or substrate 12, in and out of the bath with the "Z" slide 18, that is typically motor driven. The "Z" slide 18, is affixed to yet another slide 20, that translates in the "X" direction, i.e., right or left. The fixture 17, with the substrate or module 12 attached is affixed to one side of "Z" slide 18, while the other side of the "Z" side 18 is secured to the "X" slide 20. Thus, to introduce a module or substrate 12, into the removal tool 25, the "Z" slide 18, is brought all the way to the full "up" position. The fixture 17, to which the substrate or module 12, is affixed is positioned and attached to the "Z" slide 18. The upper surface 19, of the substrate or module 12, is made to be flush with the fixture flange surface 24, regardless of variations of the thickness due to the part 12. This is important to assure a uniform solder-removal process.

The module or substrate 12, and part holder fixture 17, are immersed into the fluid 35, by translating the "Z" slide 18, in the downward direction to a desired position. This position could be sensed by means, such as a microswitch (not shown). This sensing would assure immersion to the depth where the module or substrate 12, is properly aligned with a wiper blade or squeegee 23, mounted in a fixture 22, affixed to the bath wall 21. The fixture 22, also has the capability of adjusting the squeegee blade 23, in both the lateral and up or down (tilt) directions. The "X" slide 20, is then activated to translate the module or substrate 12, toward the squeegee 23. This motion continues until contact is made with the squeegee blade 29, to a predetermined force. The fluid 35, is heated via the bath's heater system 37, to the operating temperature, which must exceed the melting point of the low-melting point solder 14. For eutectic Pb-Sn solder, typically an operating temperature between 183° C. and 190° C. has been utilized, as measured by an in-line thermocouple (not shown) in contact with the front side or the solder ball side of the module or substrate 12. The stirring device 39, assures bath temperature uniformity. Upon achieving the desired operating temperature, the "Z"

slide 18, is activated to move upward. As the module or substrate 12, moves past the wiper (squeegee) blade 23, the molten solder of the low-melt alloy 14 and any dispursed solid particles are squeegeed off the I/O pads 13, and with it the still solid high-melting point solder ball, or columns 16.

The squeegee blade 23, has several design features that are unique for this type of application. The wiping end 29, of the squeegee 23, is configured such that one side has a pointed shape 29, to provide a wiping action, while the adjacent segment 27, has a flat base and acts as a bumper. The two segments 27 and 29, are designed to be slightly offset from each other by a offset or distance 28. During the solder removal operation it is preferred that the bumper 27, first makes contact with the solid solder balls or columns 16, separating them from the molten solder 14, whereupon they fall away from the substrate or module 12. This is followed by the trailing edge or wiping edge 29, which wipes the molten solder 14, that may contain dispursed solid particles off from the substrate or module 12.

It is preferred that the degree of offset 28, be about 40% of the smallest dimension of the solid ball or column 16, (high-melting point feature) which is to be removed. This design feature ensures that the solid debris material does not slip beneath the squeegee and abrade or become embedded in the ceramic surface. It has been determined that without the bumper 27, the solid solder debris abrades the ceramic surface, which is an unacceptable condition. The trailing blade angle alpha is not critical, it is typically about 45°, which has been found acceptable. A lower angle alpha requires less applied module force to account for substrate/module planarity effects. Low angles are more compliance than designs incorporating higher angles. After the desired solder populated areas of module or substrate 12, have been squeegeed, the substrate or module 12, is withdrawn from the hot fluid bath 35. For most applications it is desired that the exit temperature of the substrate or module 12, should not to exceed 150° C., so as to prevent any oxidation. The part or substrate 12, that has had the solder 16 and/or 14, removed is itself removed from the fixture 17, and can then be cleaned. After the solder ball or solder column sites have been cleaned and site dressed the parts 12, are now again ready to undergo the same I/O attachment procedure utilized to initially form the solder ball or column structures. The solid fallen off solder balls or solder columns 16, and the semi-solid or molten solder layer or material 14, can be subsequently removed from the fluid bath 35, by methods well known in the art.

A lubricating material is used to avoid embedding molten solder into the ceramic surface. The lubricant allows the pads to be dressed while preventing the solder (molten and solid) from contaminating the ceramic areas between the I/O pads. The fluid fills the micropits created by the ceramic surface roughness and also provides lubrication to enhance the squeegee and wipe action as well as wetting the surface to prevent the debris from adhering to the ceramic surface.

It should be understood that for some applications the substrate 12, secured to a fixture 17, and/or a Z-slide 18, could itself be held stationary, while the fixture 22, could be provided with mechanisms well known in the art to move the fixture 22, along with the squeegee blade 23, up and down and over the substrate 12, to remove the solder balls or solder columns 16, and wipe or scrape-off the molten dispersion 14, from the substrate or module 12, leaving the pad 13, behind.

Figure 3:
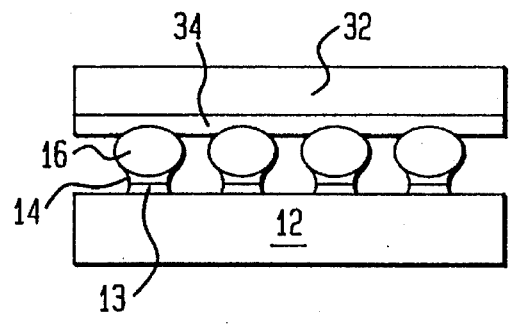
FIG. 3, illustrates yet another embodiment of the invention where a backer having an adhesive is used to remove solid material from a semiconductor substrate.

FIG. 3, illustrates yet another embodiment of the invention where a backer 32, having an adhesive 34, is used to remove solid (high melting point) material 16, from a semiconductor substrate 12. Typically, the substrate 12, is heated to a temperature-that causes the lower melting point material 14, to melt, at that time the backer 32, having the adhesive 34, is placed in contact with the solid balls or columns. The balls or columns 16, adhere to the adhesive 34, and separate from the molten pads 14, when the adhesive 34, and backer 32, are lifted away. Any left-over lower-melting point material 14, can subsequently be removed from over the pad 13, by methods well known in the art, including immersion of the substrate 12, having the molten solder pads or layer 14, into the inventive solder removal apparatus 25, and removing the solder material 14, using the squeegee blade 23.

The material for the blade or squeegee 23, could be selected from a group comprising of materials that are thermally stable up to 250° C., and whose Shore durometer hardness ranges between about 50 to about 80. Examples for such material are FKM materials, fluoroelestomer materials, such as, Viton or Flourel.

It is preferred that the fluid for the fluid bath 35, is selected from a group comprising fluids that have a viscosity of between about 60 and about 100 centistokes at 100° C. For example, the fluid could be a polyolefin oil.

EXAMPLES

The following examples are intended to further illustrate the invention and are not intended to limit the scope of the invention in any manner.

EXAMPLE 1

Solder balls 16, having a diameter of 35 mils were removed from a substrate 12. The substrate 12, using the tool shown in FIG. 1, was immersed in fluid bath comprising of polyolefin oil, Synton PAO-100 (kinematic viscosity is about 100 centistoke at 100° C.) with 0.06 wt. % Irganox 1010 anti-oxidant. The temperature of the fluid bath was then slowly raised to 190° C. The squeegee blade 23, was then used to remove solid 90 PbSn solder balls 16 and molten off-eutectic Pb-Sn solder 14 containing solid proeutectic Pb-rich phase off from the substrate 12. The squeegee blade 23, for this application had an offset 28, of about 40%, which for the 35 mil diameter solder ball was 14 mils.

EXAMPLE 2

Solder columns 16, having a diameter of 20 mils were removed from a substrate 12. The substrate 12, using the tool shown in FIG. 1, was immersed in fluid bath comprising of polyolefin oil, Synton PAO-100 (kinematic viscosity is about 100 centistoke at 100° C.) with 0.06 wt. % Irganox 1010 anti-oxidant. The temperature of the fluid bath was then slowly raised to 190° C. The squeegee blade 23, was then used to wipe off the solid 90 PbSn solder columns 16 and molten off-eutectic Pb-Sn solder 14, containing solid pro-eutectic Pb-rich phase from the substrate 12. The squeegee blade 23, for this application had an offset 28, of about 40%, which for the 20 mil diameter solder columns was 8 mils.

For the substrates of both Examples 1 and 2, comprehensive testing was carried out to qualify this rework process on modules. Such testing included accelerated thermal cycling (ATC) to test the fatigue life of reworked modules compared with non-reworked modules for equivalence; temperature and humidity testing to check for metal migration and corrosion; cross sectioning to examine the metallurgical structure of the joint after rework, ceramic substrate surface analysis to check for solder particle imbedding. None of the substrates showed any adverse impact as a result of solder removal using this inventive process.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. A method for removing at least one molten or solid structure from a surface comprising the steps of:
   (a) placing said surface with said at least one molten or solid structure in at least one fluid bath,
   (b) raising the temperature of said fluid bath to the melting point level of said at least one molten or solid structure, and
   (c) squeegeeing off said at least one molten or solid structure from said surface by using at least one blade.

2. The method of claim 1, wherein said at least one blade has at least one bumper to bump against said at least one solid structure.

3. The method of claim 1, wherein said at least one blade has at least one trailing edge to sweep said at least molten structure from said surface.

4. The method of claim 3, wherein said trailing edge is wedge shaped and said wedge has an angle alpha.

5. The method of claim 1, wherein the material for said at least one blade is selected from a group consisting of materials that are thermally stable up to 250° C., and whose Shore durometer hardness ranges between about 50 to about 80.

6. The method of claim 1, wherein said at least one molten or solid structure is selected from a group consisting of low melting point solder, high melting point solder, molten solder which contains disbursed solid particles, eutectic solder, liquid metal, solder balls, solder columns and dual alloy solder.

7. The method of claim 1, wherein the material for said fluid bath is selected from a group consisting of fluids having a viscosity of between about 60 and about 100 centistokes at 100° C.

8. The method of claim 1, wherein said at least one solid structure is at least one solder ball or solder column.

9. The method of claim 1, wherein said at least one molten structure is at least one molten pad which may contain variable amounts of solid particles.

10. The method of claim 1, wherein said structure comprises of at least two materials, wherein at least one first material is a low melting point solder and at least one second material is a high melting point solder.

11. The method of claim 1, wherein at least one stirrer stirs said at least one fluid bath.

12. The method of claim 1, wherein at least one heater heats said at least one fluid bath.

13. An apparatus for removing at least one molten or solid structure from the surface of a substrate comprising:
   (a) a container having at least one fluid bath,
   (b) at least one means to immerse at least a portion of said substrate into at least a portion of said at least one fluid bath,
   (c) said container having at least one means to secure and relatively move at least one blade,
   (d) at least one means in said container to raise the temperature of said fluid bath to the melting point level of said at least one molten or solid structure, and
   (e) wherein at least a portion of said at least one blade has means to slide against a portion of the surface of said substrate to remove said at least one molten or solid structure from said surface.

14. The apparatus of claim 13, wherein said at least one blade has at least one bumper to bump against said at least one solid structure.

15. The apparatus of claim 13, wherein said at least one blade has at least one trailing edge to sweep said at least one molten or solid structure from said surface.

16. The apparatus of claim 15, wherein said trailing edge is wedge shaped and said wedge has an angle alpha.

17. The apparatus of claim 13, wherein the material for said at least one blade is selected from a group consisting of materials that are thermally stable up to 250° C., and whose Shore durometer hardness ranges between about 50 to about 80.

18. The apparatus of claim 13, wherein said at least one molten or solid structure is selected from a group consisting of low melting point solder, high melting point solder, molten solder which contains disbursed solid particles, eutectic solder, liquid metal, solder balls, solder columns and dual alloy solder.

19. The apparatus of claim 13, wherein the material for said fluid bath is selected from a group consisting of fluids having a viscosity of between about 60 and about 100 centistokes at 100° C.

20. The apparatus of claim 13, wherein said at least one solid structure is at least one solder ball or column.

21. The apparatus of claim 13, wherein said at least one molten or solid structure is at least one molten pad which may contain variable amounts of solid particles.

22. The apparatus of claim 13, wherein said structure comprises of at least two materials, wherein at least one first material is a low melting point solder and at least one second material is a high melting point solder.

23. The apparatus of claim 13, wherein at least one stirrer stirs said at least one fluid bath.

24. The apparatus of claim 13, wherein at least one heater heats said at least one fluid bath.

* * * * *